US009655468B2

United States Patent
Thul et al.

(10) Patent No.: US 9,655,468 B2
(45) Date of Patent: May 23, 2017

(54) APPARATUS AND PROCESS FOR RAPIDLY COOKING FOOD

(71) Applicant: 2T2J, Inc., Austin, TX (US)

(72) Inventors: Travis Michael Thul, Halethorpe, MD (US); Jiju George Johnson, Milwaukee, WI (US)

(73) Assignee: 2T2J, Inc., Austin, TX (US)

( * ) Notice: Subject to any disclaimer, the term of this patent is extended or adjusted under 35 U.S.C. 154(b) by 0 days.

(21) Appl. No.: 14/532,380

(22) Filed: Nov. 4, 2014

(65) Prior Publication Data

US 2015/0196154 A1      Jul. 16, 2015

Related U.S. Application Data

(60) Provisional application No. 61/925,986, filed on Jan. 10, 2014.

(51) Int. Cl.
| | | |
|---|---|---|
| *A01J 11/04* | (2006.01) |
| *A01J 13/00* | (2006.01) |
| *A01J 15/14* | (2006.01) |
| *A23L 1/00* | (2006.01) |
| *A23P 1/00* | (2006.01) |
| *A21B 1/08* | (2006.01) |
| *F24D 1/00* | (2006.01) |
| *F27D 11/00* | (2006.01) |
| *A21B 1/00* | (2006.01) |

(Continued)

(52) U.S. Cl.
CPC .......... *A47J 27/04* (2013.01); *A47J 2027/043* (2013.01)

(58) Field of Classification Search
CPC ... A21B 3/04; A47J 27/04; A47J 27/16; A47J 2027/043; F24C 15/32; F24C 15/327

USPC .......... 99/330–333, 352, 355, 403, 467–468, 99/481; 426/510–511; 126/20, 369; 219/401, 731

See application file for complete search history.

(56) References Cited

U.S. PATENT DOCUMENTS

| | | | |
|---|---|---|---|
| 4,495,932 A | 1/1985 | Bratton |
| 5,215,000 A | * 6/1993 | Desage | ..................... F22B 1/30 126/20 |

(Continued)

FOREIGN PATENT DOCUMENTS

CN          202955750 U        5/2013

OTHER PUBLICATIONS

International Search Report and Written Opinion on International Application No. PCT/US2015/010807 (107223-0104), mail date May 11, 2015, 7 pages.

*Primary Examiner* — Dana Ross
*Assistant Examiner* — Lindsey C Staubach
(74) *Attorney, Agent, or Firm* — Foley & Lardner LLP

(57) ABSTRACT

An apparatus for rapidly cooking food includes a housing having a reservoir, a heating element, a binary distributor, and a container. In a method of using the apparatus for rapidly cooking food, food is placed into the container and water is poured into the reservoir. The heating element heats the water in the reservoir, and the resulting steam travels into the binary distributor. Pressurized steam then exits the binary distributor to uniformally cook the top of the food. Condensed steam gathers at the bottom of the container and is kept at a temperature capable of cooking the food. In such a way, food in the container is rapidly cooked. In one embodiment, the food to be cooked is a single serving of ramen brick style noodles.

19 Claims, 7 Drawing Sheets

(51) Int. Cl.
     *A21B 1/22*          (2006.01)
     *A47J 27/04*         (2006.01)

(56)          References Cited

U.S. PATENT DOCUMENTS

| | | | |
|---|---|---|---|
| 5,279,213 | A | 1/1994 | Miyahara |
| 5,402,709 | A * | 4/1995 | Carron .................... A47J 27/16 |
| | | | 126/20 |
| 5,869,812 | A | 2/1999 | Creamer et al. |
| 6,171,630 | B1 * | 1/2001 | Stanger ................... A47J 27/04 |
| | | | 426/510 |
| 6,516,709 | B1 * | 2/2003 | Lin ......................... A47J 27/04 |
| | | | 126/369 |
| 2004/0011222 | A1 * | 1/2004 | Fisher ..................... A21B 3/04 |
| | | | 99/485 |
| 2007/0227364 | A1 | 10/2007 | Andoh et al. |
| 2011/0256287 | A1 * | 10/2011 | Sus ........................ A23L 1/0121 |
| | | | 426/510 |
| 2013/0019856 | A1 | 1/2013 | Buehler |
| 2013/0280394 | A1 * | 10/2013 | Ewald ..................... A47J 39/00 |
| | | | 426/392 |
| 2015/0047514 | A1 * | 2/2015 | Abe ........................ F24C 15/327 |
| | | | 99/403 |

* cited by examiner

APPARATUS AND PROCESS FOR RAPIDLY COOKING FOOD

CROSS-REFERENCE TO RELATED PATENT APPLICATIONS

This application claims priority from U.S. Provisional Application No. 61/925,986, filed Jan. 10, 2014, which is incorporated herein by reference in its entirety.

TECHNOLOGY

The present technology generally relates cooking implements and methods of cooking.

SUMMARY

An apparatus and process for rapidly cooking food is disclosed. Various embodiments are intended to provide for an alternative, independent, and self-contained means of preparing food.

In one embodiment, the present technology is intended to provide a means of rapidly cooking MARUCHAN®, NISSIN®, and other branded ramen dried noodle brick type soups.

In one embodiment the apparatus includes a water reservoir, heating element, a binary distributor, and a removable container. Water stored in the reservoir is heated by the heating element, causing the water to steam upward into a thermal distribution channel of the binary distributor. The steam is pressurized inside the thermal distribution channel and exits the binary distributor via outlet ports. This pressurized steam exiting the outlet port is directed uniformly downward over the food in the container. As the steam passes over the food in the container, the steam cooks the top of the food and then condenses. This condensed steam accumulates around the bottom of the removable container and begins to fill the container. The hot plate maintains this condensed heat accumulating at the bottom of the container at a temperature capable of cooking the food. With pressurized steam cooking the upper surface of the food and water condensate cooking the food from the bottom, the food is rapidly cooked by the apparatus for rapidly cooking food.

In some embodiments, the apparatus may also include a gasket disposed between the container and the binary distributor. The gasket is configured to create a vapor seal that prevents the pressurized steam exiting the outlet ports from escaping into the environment. The apparatus may also include a controller programmed to control the use of the apparatus, as well as a safety probe that automatically disables the apparatus. Furthermore, the shape and size of the hot plate, binary distributor and container may be varied. In one embodiment, where the apparatus is used to cook ramen noodles, the shape and size may be generally rectangular to match the shape of the ramen noodle brick. Optionally, the container of the apparatus may double as bowl such that, once the preparation process is complete, the container may be removed and used to consume the meal.

BRIEF DESCRIPTION OF THE DRAWINGS

The proposed design, details, and overall apparatus architecture of the present technology are outlined in the following drawings in which.

DETAILED DESCRIPTION

Figure 1:
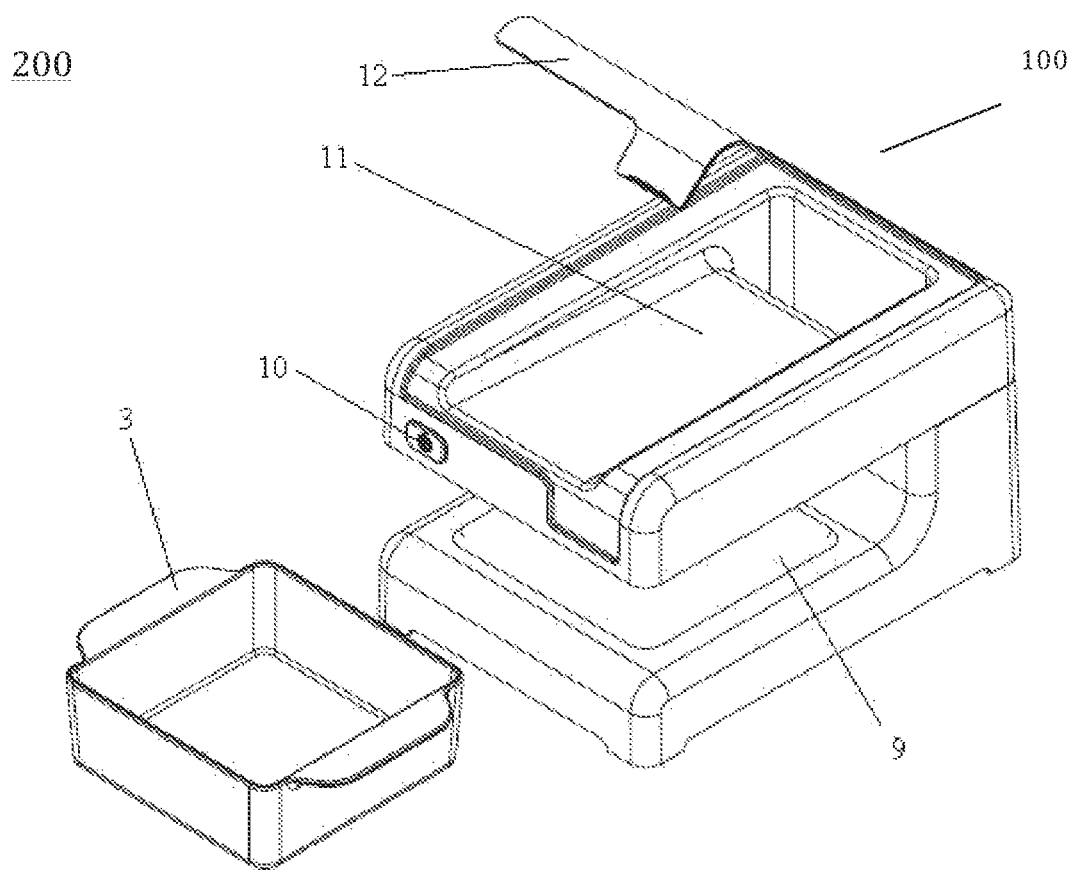
FIG. 1 is a perspective view of an apparatus for rapidly cooking food items, according to one embodiment.
Figure 2:
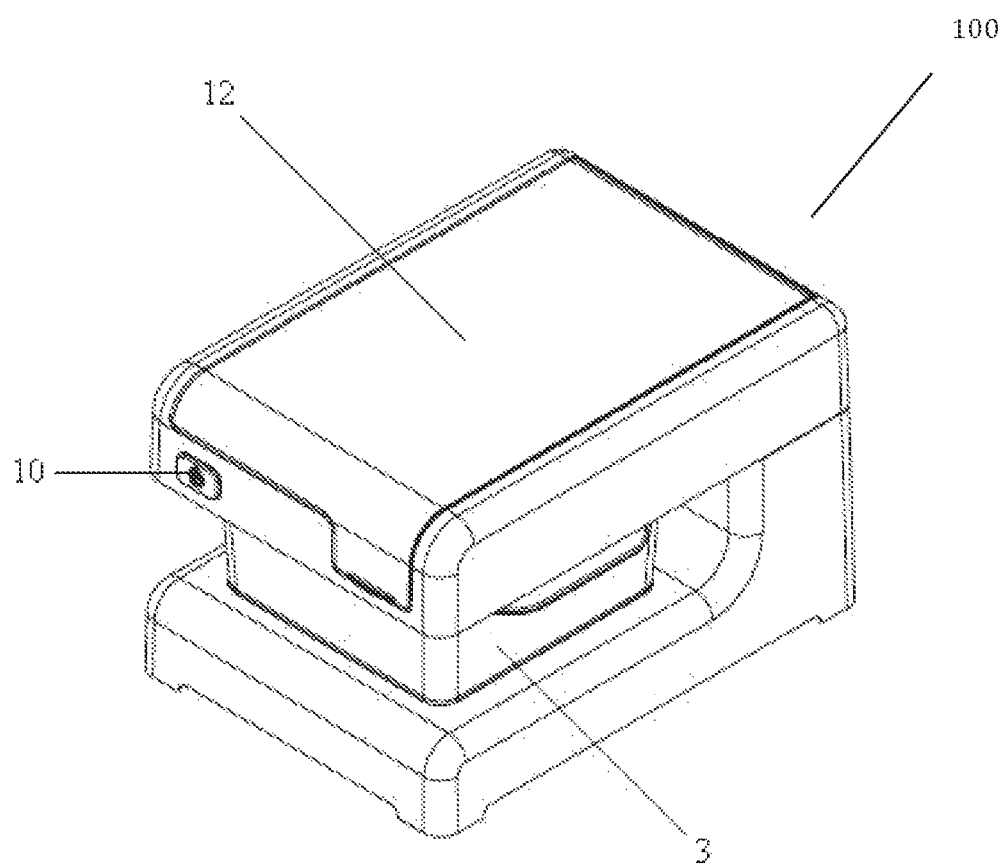
FIG. 2 is a perspective view of an apparatus for rapidly cooking food items, according to one embodiment.
Figure 3:
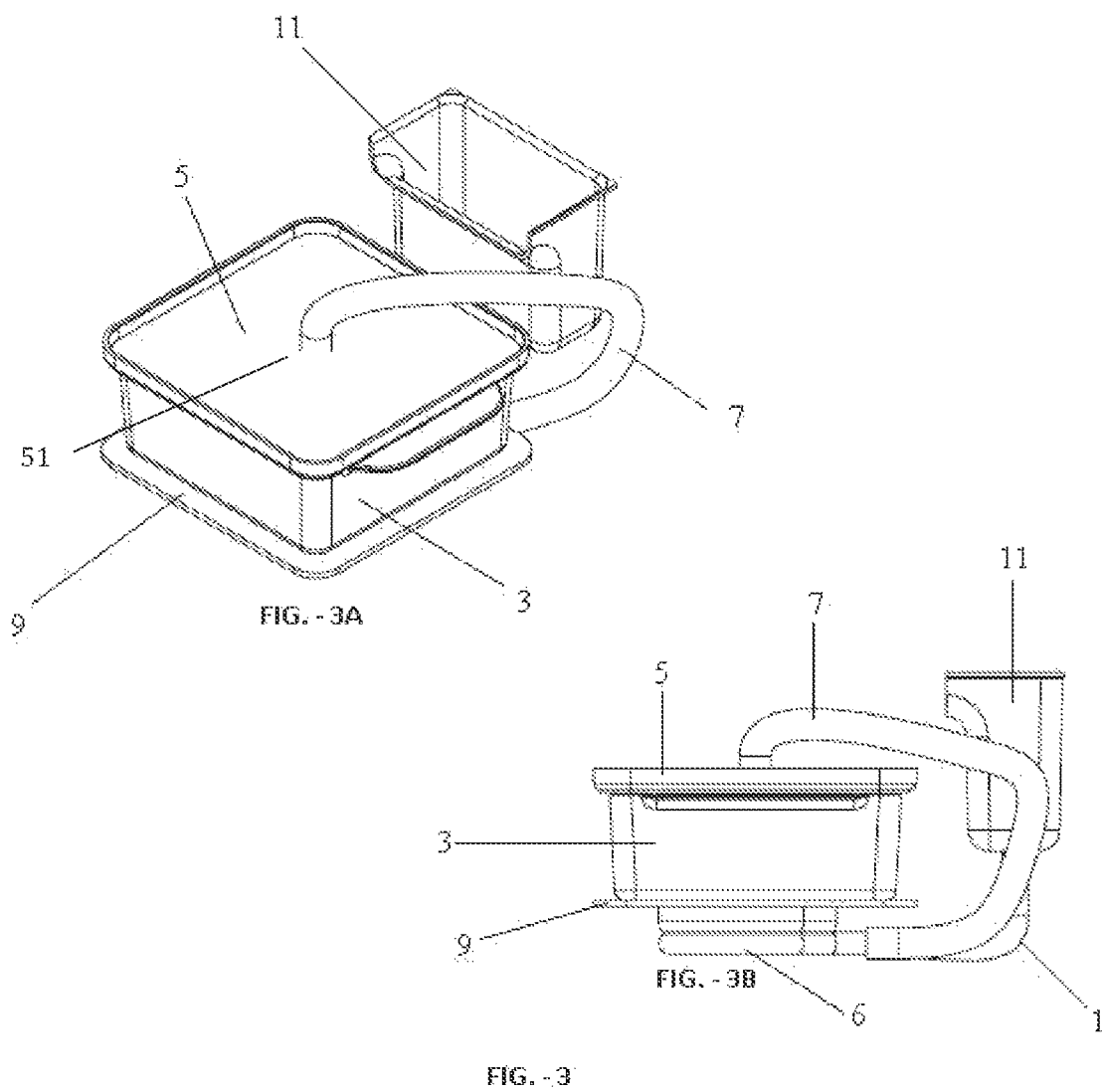
FIGS. 3A and B are additional perspective views of an apparatus for rapidly cooking food items with a container interlocked with the housing, according to one embodiment.

The following terminology will be used in accordance with the definitions set forth below.

The singular forms "a," "an," and, "the" include plural referents unless the context clearly dictates otherwise. Thus, for example, reference to "a heating element" includes reference to one or more of such heating elements.

As used herein, the term "about" is used to provide flexibility to a numerical range endpoint by providing that a given value may be "a little above" or "a little below" the endpoint.

As used herein, the term "substantially" refers to the complete or nearly complete extent or degree of an action, characteristic, property, state, structure, item, or result. The exact allowable degree of deviation from absolute completeness may in some cases depend on the specific context. However, generally speaking the nearness of completion will be so as to have the same overall result as if absolute and total completion were obtained. The use of "substantially" is equally applicable when used in a negative connotation to refer to the complete or near complete lack of an action, characteristic, property, state, structure, item, or result.

As used herein, a plurality of items, structural elements, compositional elements, and/or materials may be presented in a common list for convenience. However, these lists should be construed as though each member of the list is individually identified as a separate and unique member. Thus, no individual member of such list should be construed as a de facto equivalent of any other member of the same list solely based on their presentation in a common group without indications to the contrary.

FIGS. 1-7 illustrate one embodiment of an apparatus 200 for rapidly cooking food items. In one embodiment, an apparatus 200 for rapidly cooking food items comprises a housing 100 used to cook food that is placed into container 3. The housing includes a liquid reservoir 11, a lid 12 providing access to the reservoir 11, a hot plate 9, a heating mechanism, and an on/off switch 10.

FIGS. 3A and 3B illustrate one embodiment of heating mechanism used to heat food items of the apparatus 200 for rapidly cooking food items. As seen in FIG. 3B, an inlet of a heating element 6 is fluidly connected to an outlet end of the reservoir 11 via a first tube 1. Heating element 6 may comprise one or a plurality of heating elements. As seen in FIG. 3A, an outlet of heating element 6 is fluidly connected to an inlet 51 of a binary distributor 50 via a second tube 7. Heating element 6 is also thermally connected to hot plate 9. In one embodiment (as seen in FIG. 3B) hot plate 9 is thermally connected to heating element 6 by being disposed atop heating element 6. However, it is to be understood that hot plate 9 may be thermally connected to heating element 6 by any number of thermal connection, and thus the placement of heating element 6 with respect hot plate 9 may be any configuration as desired.

Figure 4:
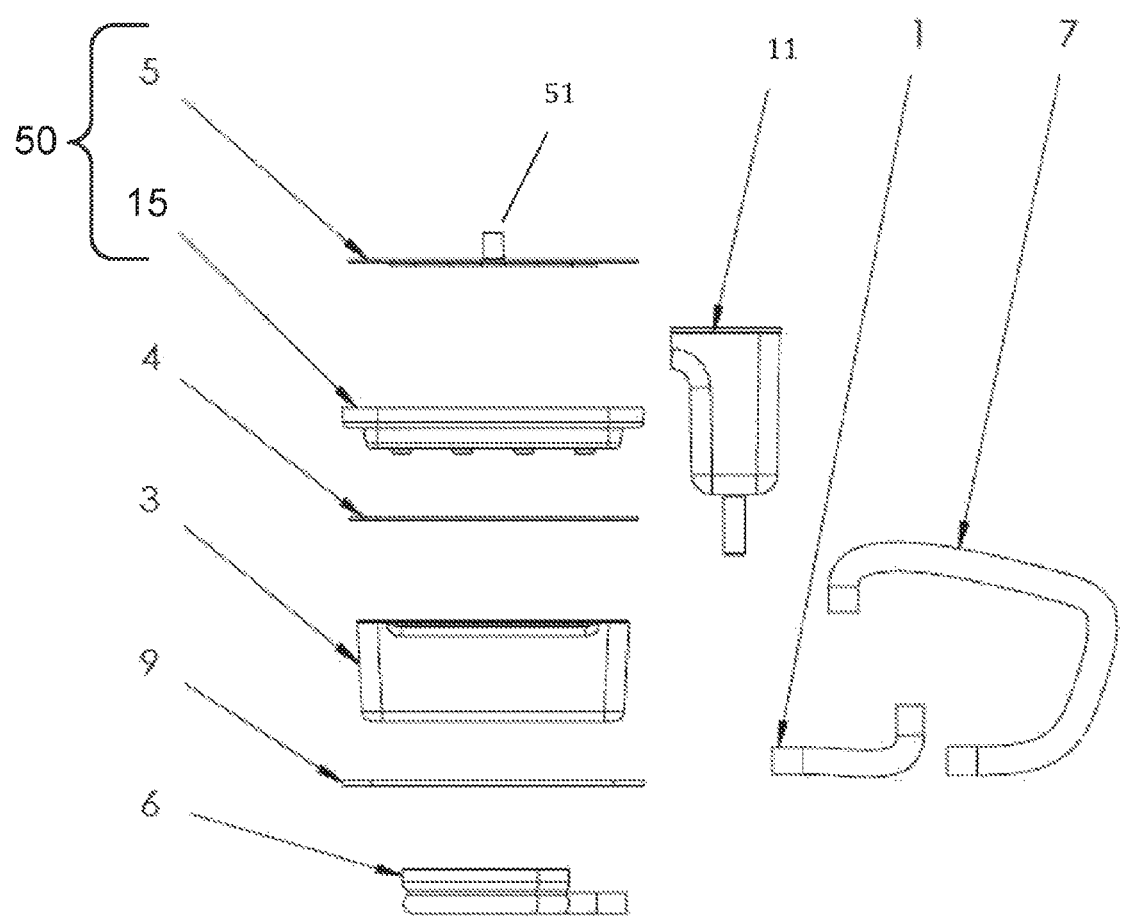
FIG. 4 is an exploded view of certain components of an apparatus for rapidly cooking food items according to one embodiment.
Figure 5:
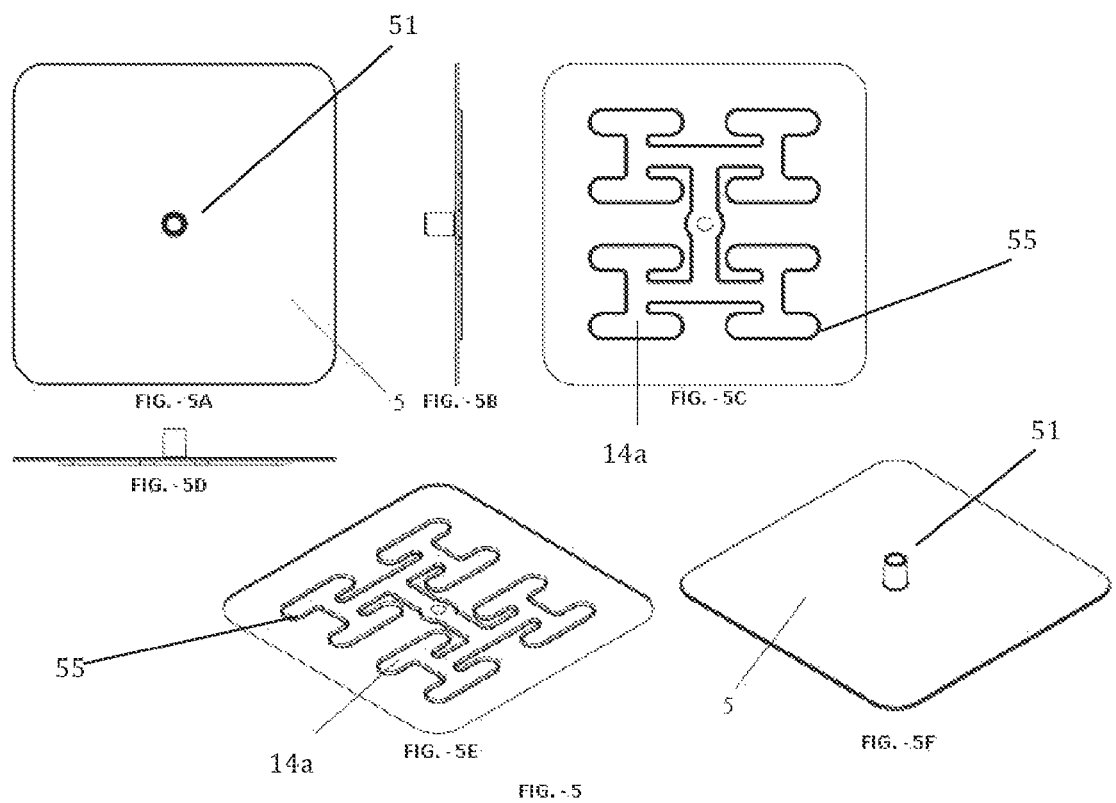
FIGS. 5A-F illustrates different perspective views of the top seal portion of the binary distributor according to one embodiment.
Figure 6:
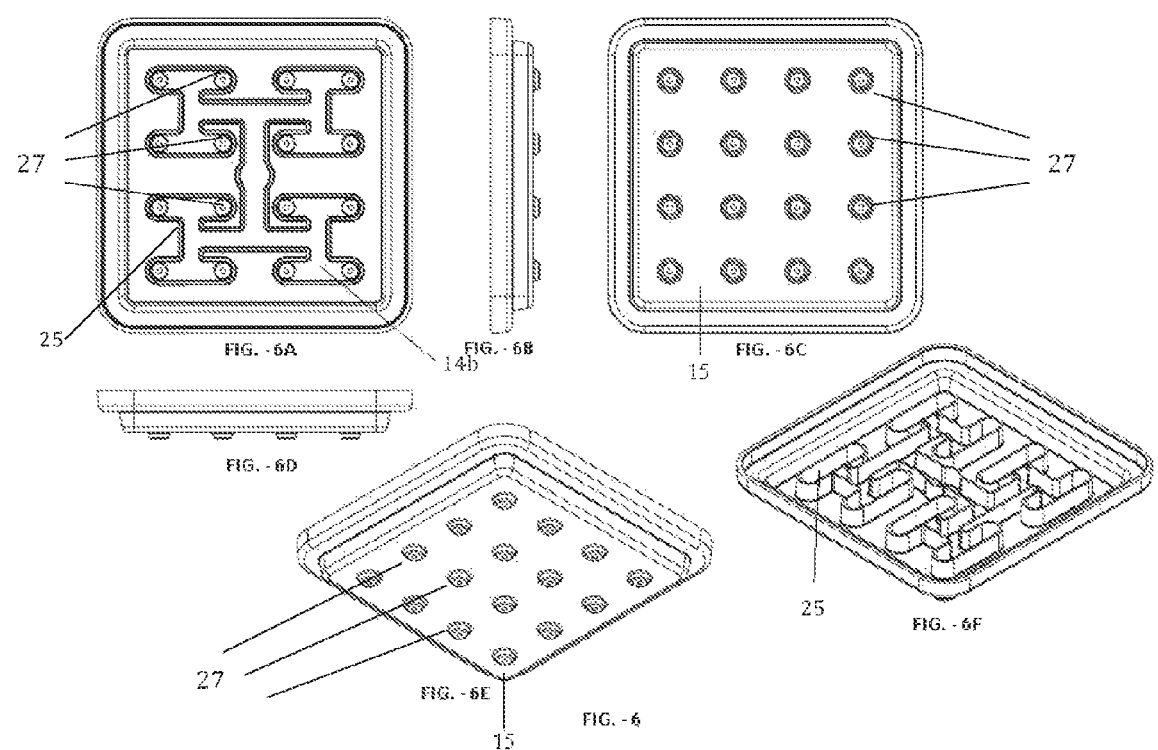
FIGS. 6A-F illustrates different perspective views of the bottom outlet portion of the binary distributor according to one embodiment.

As seen in FIG. 4-6, binary distributor 50 comprises a top seal portion 5 and a bottom outlet portion 15. The mating of top seal portion 5 and bottom outlet portion 15 forms a binary distributor 50 having a thermal distribution channel 14. As seen in FIGS. 5A-5F, the inlet 51 to binary distributor 50 is located on the upper surface of top seal portion 5. As seen in FIG. 5B-5E, extending from the bottom surface of top seal portion 5 is a wall 55 defining a top half 14a of thermal distribution channel 14.

The bottom outlet portion 15 of binary distributor 50 is illustrated in FIGS. 6A-6F. As seen in FIG. 6F, extending from the top surface of bottom outlet portion 15 is a wall 25 defining a bottom half 14b of thermal distribution channel 14. The arrangement of wall 25 of bottom outlet portion 15 mirrors the arrangement of the wall 55 of top seal portion 5. Thus, when top seal portion 5 and bottom outlet portion 15 are connected together to form binary distributor 50, wall 25 and wall 55 align to define thermal distribution channel 14.

As seen in FIG. 6A, located within the bottom half 14b of thermal distribution channel 14 are a plurality of outlet ports 27. As seen in FIG. 6C, the outlet ports 27 are spaced within the bottom part 14b of thermal distribution channel 14 at predetermined locations such that the outlet ports 27 form a generally uniform arrangement on the bottom surface of bottom outlet portion 15.

Top seal portion 5 and bottom outlet portion 15 are constructed such that when the two portions are connected together, the two portions form a tight seal connection that is configured to prevent steam and/or fluid from escaping from the thermal distribution channel 14 of the binary distributor 50 except for through outlet ports 27. Alternatively binary distributor 50 can be constructed as a unitary component comprising an inlet 51, a thermal distribution channel 14, and outlet ports 27. Although FIGS. 5 and 6 illustrate one embodiment of the pattern, size, shape and configuration of thermal distribution channel 14 and outlet ports 27, it should be recognized that that the pattern, size, shape and configuration of both the thermal distribution channel 14 and outlet ports 27, as well as the number of outlet ports 27 may be varied. It should also be understood that the shape and size of container 3 can take on any numerous embodiments. Furthermore, although in one embodiment (as seen in FIG. 4) the shape and size of hot plate 9 and binary distributor 50 generally match the shape and size of container 3, the shape and size of hot plate 9 and binary distributor 50 can comprise any number of shapes and sizes.

Figure 7:
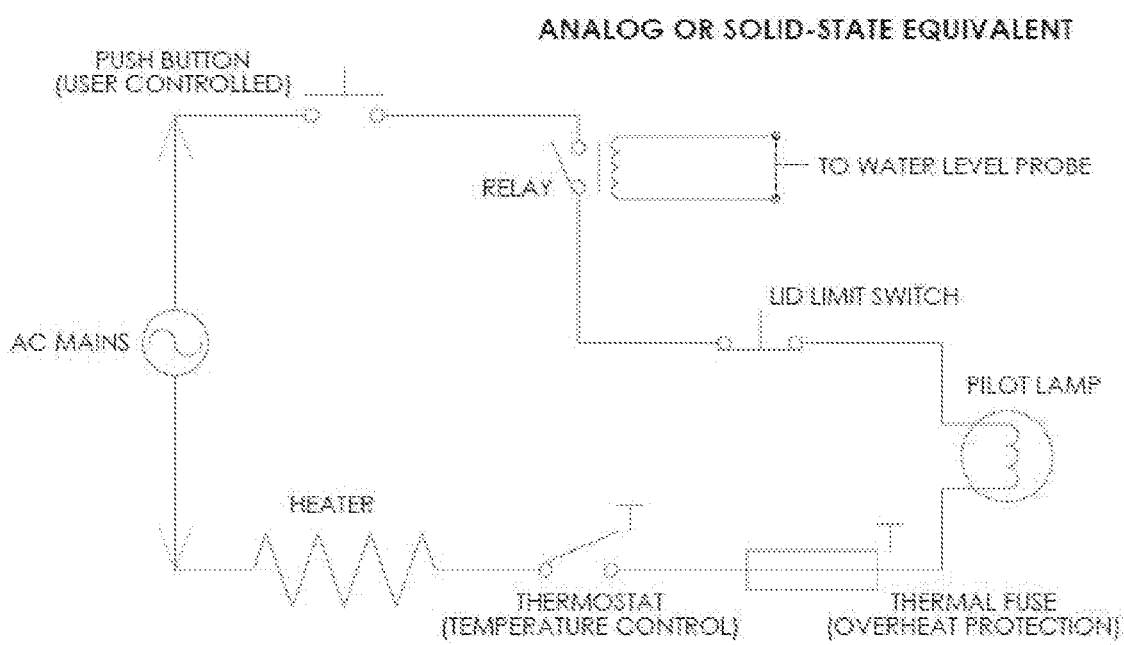
FIG. 7 illustrates an electrical control circuit according to one embodiment.

As seen in FIG. 7, the apparatus 200 for rapidly cooking food items may also incorporate a safety feature. After all water has left reservoir 11, the water level probe shown in FIG. 7 is triggered, opening the cooking circuit and disabling heating element 6. The user can then open lid 12, disengage container 3 from the binary distributor gasket 4, and remove the rapidly cooked food contained in container 3.

Additionally, the apparatus 200 for rapidly cooking food items may optionally include a controller. Controller may be programmed to control any number of features of the apparatus 200 for rapidly cooking food items. For example, the controller may be programmed to control the amount of water in reservoir 11 to use when cooking food. Based on a user selected input of the type of food and the amount of food to be cooked, or the desired amount of water to be used, the controller may control the apparatus 200 for rapidly cooking food items to only use a predetermined amount of water regardless of the amount of water in reservoir 11. Among other things, controller may also be programmed to: separately and independently control heating of the hot plate 9 and the water in the reservoir 11 using the heating element 6; control the temperature of hot plate 9 based on a user input of the type of food and/or the amount of food to be cooked; automatically switch off the device after a predetermined time; allow the heating element 6 to act in a 'warm only' mode wherein heating element 6 only heats hot plate 9 and not water once a predetermined amount of time has passed; sound an alarm when the food has finished cooking; etc.

In use, food desired to be cooked using the apparatus 200 for rapidly cooking food items is placed into container 3, and container 3 is inserted into housing 100 such that container 3 rests atop hot plate 9. Lid 12 is lifted and a desired amount of water is poured into reservoir 11. Lid 12 is closed and the apparatus 200 is turned on using on/off switch 10.

When the apparatus 200 in turned on using the on/off switch 10, heating element 6 is turned on, and liquid from the reservoir 11 flows through the reservoir-to-heater tube 1 and into heating element 6. Once the water in the heating element 6 begins to boil, steam generated from the boiling water rises up through the heater-to-distributor tube 7 and enters into thermal distribution channel 14 of the binary distributor 50 via inlet 51.

As steam accumulates in the thermal distribution channel 14, the resulting pressure buildup will force steam out from thermal distribution channel 14 through the outlet ports 27 and into the container 3 in an evenly distributed manner. This high pressure steam will evenly cook the top portion of the food in container 3 while condensing into near boiling water about the bottom of the container 3. Because the hot plate 9 is thermally connected to and thus heated by heating element 6, the near boiling water that accumulates at the bottom of container 3 remains at a temperature capable of cooking the food in container 3.

In one embodiment, the speed at which food is cooked is increased by incorporating a gasket 4 that is configured to create a vapor tight seal between container 3 and binary distributor 50. Because the vapor tight seal produced by gasket 4 is configured to prevent or minimize steam evaporating and escaping container 3, pressure within container 3 is increased. This increased pressure within the container 3 further encourages condensation of the steam at the bottom of container 3. This accumulated condensed water, which is reheated by the hot plate 9, increases the rate at which food in container 3 is cooked.

In one embodiment, the food to be cooked includes ramen noodles such as MARUCHAN®, NISSIN®, and other branded ramen dried noodle brick type soups. Preferably, in this embodiment container 3 comprises a generally rectangular shape matching the shape of the ramen dried noodle brick. Container 3 is sized so as to be large enough to accommodate the ramen noodles and broth once the ramen dried noodle brick has been cooked by the apparatus 200 for rapidly cooking food items. In this embodiment, the reservoir 11 may specifically be designed to hold a volume of water needed to cook the ramen brick style noodles. The inside of the reservoir 11 may include a marking indicating to a user how much water to pour into the reservoir 11. In this embodiment, the apparatus 200 for rapidly cooking food items may be programmed to automatically disable the after a predetermined time that is needed to specifically cook ramen brick style noodles. Additionally or alternatively, the apparatus 200 for rapidly cooking food items may include a probe (such as described with reference to FIG. 7), wherein after the predetermined amount of water need to cook ramen brick style noodles has left reservoir 11, the water level probe shown in FIG. 7 is triggered, opening the cooking circuit and disabling heating element 6.

When cooking certain foods—such as, e.g. ramen noodles—it is desirable for the food to be cooked simultaneously by high-pressure steam and by the reheated condensed water that collects in container 3, (e.g. as in the embodiments described above). However, when cooking other types of food it may be desirable for the food to only be cooked by steam. Thus, in an alternative embodiment, container 3 may include a top strainer portion and a bottom tray portion (not shown). The bottom of top strainer portion may include a plurality of openings. When the high-pressure steam that emerges from the outlet ports 27 of binary distributor 50 condenses, the water will pass through the plurality of openings at the bottom of the top strainer portion and will instead collect in the bottom tray portion. Because bottom tray portion is in contact with hot plate 9, the near boiling water that collects in bottom tray portion will be reheated. Hot plate 9 can be programmed and controlled to achieve a temperature high enough to bring the water collecting in bottom tray portion to a boil. Thus, as the collected water in the tray portion is reheated by the hot plate 9 to boiling temperature, the water in the tray portion will begin to form steam. The steam rising from the water in bottom tray portion will then pass through the plurality of openings in the bottom of strainer portion to cook the bottom of food in container 3. In this embodiment, in addition to including a gasket 4 to create a vapor tight seal between container 3 and binary distributor 50, another gasket (not shown) may also be provided between top strainer portion and bottom tray portion of container 3 so as to also create a vapor tight seal.

Of course, it is to be understood that the above-described embodiments and arrangements are only illustrative of the application of the principles of the present apparatus for rapidly cooking food. Numerous modifications and alternative arrangements may be devised by those skilled in the art without departing from the spirit and scope of the present technology and the appended claims are intended to cover such modifications and arrangements. Thus, while the present technology has been described above with particularity and detail in connection with what is presently deemed to be the most practical and preferred embodiments, it will be apparent to those of ordinary skill in the art that numerous modifications, including, but not limited to, variations in size, materials, shape, form, function and manner of operation, assembly and use may be made without departing from the principles and concepts set forth herein.

What is claimed is:

1. An apparatus for rapidly cooking food, the apparatus comprising:
   a housing comprising
      a reservoir,
      a hot plate,
      a heating element, and
      a binary distributor;
   a container configured to be placed in the housing in a position above the hot plate and below the binary distributor; and
   a gasket positioned between the container and the binary distributor;
   wherein the heating element is configured to heat water in the reservoir, thereby producing steam that travels into the binary distributor,
   wherein the binary distributor is configured to pressurize the steam, thereby producing pressurized steam that exits a bottom of the binary distributor, enters a top of the container, and cooks a top portion of food located in the container, and
   wherein the gasket is configured to create a vapor tight seal between the container and the binary distributor to prevent any pressurized steam exiting the binary distributor from escaping into the surrounding environment.

2. The apparatus of claim 1, wherein
   the reservoir comprises an outlet;
   the heating element comprises an inlet and a separate outlet;
   the binary distributor comprises an inlet; and
   the outlet of the reservoir is connected to the inlet of the heating element via a first tube and the outlet of the heating element is connected to the inlet of the binary distributor via a second tube.

3. The apparatus of claim 2, wherein
   the first tube is configured to provide for transfer of water from the reservoir to the heating element and the second tube is configured to provide for transfer of steam from the heating element to the binary distributor.

4. The apparatus of claim 1, wherein
   the binary distributor comprises a top seal portion and a bottom outlet portion together defining a thermal distribution channel;
   wherein the thermal distribution channel is configured to pressurize and collect the steam entering into the binary distributor prior to the steam exiting the binary distributor.

5. The apparatus of claim 4, wherein
   the bottom outlet portion of the binary distributor comprises a plurality of outlet ports uniformly arranged on a bottom surface of the bottom outlet portion;
   the outlet ports are arranged on the bottom outlet portion such that the outlet ports are fluidly connected to the thermal distribution channel; and
   the outlet ports are configured to allow the pressurized steam in the thermal distribution channel to exit the bottom of the binary distributor so as to uniformly cook the top of the food placed in the container.

6. The apparatus of claim 1, wherein
   the heating element is thermally connected to the hot plate;
   the container is configured to be positioned atop the hot plate such that after the pressurized steam exiting the binary distributor cooks the top portion of food in the container, condensed steam accumulates at a bottom of the container; and
   the heating element is configured to the warm the hot plate to a temperature sufficient to reheat the condensed steam accumulated at the bottom of the container to a temperature at which the condensed steam is capable of cooking food in the container.

7. The apparatus of claim 1, wherein the food to be cooked comprises a single ramen dried noodle brick.

8. The apparatus of claim 7, wherein
   the container has a generally rectangular shape that matches a shape of the ramen dried noodle brick; and the container is sized so as to be large enough to accommodate ramen noodles and broth once the ramen dried noodle brick has been cooked.

9. The apparatus of claim 8, wherein the hot plate and the binary distributor both have shapes and sizes that generally mirror the rectangular shape of the container.

10. The apparatus of claim 7, wherein the reservoir generally has a volume equal to a volume required to cook the ramen dried noodle brick.

11. The apparatus of claim 1, further comprising a controller programmed to automatically disable the heating element after a predetermined time.

12. The apparatus of claim 11, wherein the predetermined time is a time required to cook a single ramen dried noodle brick.

13. The apparatus of claim 1, further comprising a water level probe configured to disable the heating element after all the water has left the reservoir.

14. An apparatus for rapidly cooking food, the apparatus comprising:
a housing comprising
a reservoir,
a hot plate,
a heating element, and
a binary distributor;
a container configured to be placed in the housing in a position above the hot plate and below the binary distributor; and
a gasket positioned between the container and the binary distributor;
wherein:
the heating element is configured to heat water in the reservoir, thereby producing steam that travels into the binary distributor;
the binary distributor is configured to pressurize the steam, thereby producing pressurized steam that exits the binary distributor, cooks a top portion of food located in the container, and condenses into condensed steam that accumulates at a bottom of the container;
the heating element is further configured to warm the hot plate to a temperature sufficient to reheat the condensed steam accumulated at the bottom of the container to a temperature at which the condensed steam is capable of cooking food in the container; and
the gasket is configured to create a vapor tight seal between the container and the binary distributor to prevent any pressurized steam exiting the binary distributor from escaping into the surrounding environment.

15. An apparatus for rapidly cooking food, the apparatus comprising:
a housing comprising:
a reservoir comprising an outlet;
a hot plate;
a heating element comprising an inlet and a separate outlet; and
a binary distributor comprising an inlet, a top seal portion, and a bottom outlet portion, wherein the top seal portion and the bottom outlet portion together define a thermal distribution channel;
a container configured to be placed in the housing; and
a gasket positioned between the container and the binary distributor;

wherein:
the apparatus is configured to heat water in the reservoir via the heating element, thereby producing steam which travels through and exits the binary distributor, so as to rapidly cook food located in the container;
the outlet of the reservoir is connected to the inlet of the heating element via a first tube and the outlet of the heating element is connected to the inlet of the binary distributor via a second tube;
the first tube is configured to provide for transfer of water from the reservoir to the heating element and the second tube is configured to provide for transfer of steam from the heating element to the binary distributor;
the thermal distribution channel is configured to pressurize and collect the steam entering into the binary distributor from the second tube prior to the steam exiting the binary distributor to cook food in the container; and
the gasket is configured to create a vapor tight seal between the container and the binary distributor to prevent any pressurized steam exiting the binary distributor from escaping into the surrounding environment.

16. The apparatus of claim 15, wherein:
the bottom outlet portion of the binary distributor comprises a plurality of outlet ports uniformly arranged on a bottom surface of bottom outlet portion;
the outlet ports are arranged on the bottom outlet portion such that the outlet ports are fluidly connected to the thermal distribution channel; and
the outlet ports are configured to allow the pressurized steam in the thermal distribution channel to exit the bottom of the binary distributor so as to uniformly cook the top of the food placed in the container.

17. A method for rapidly cooking food comprising the steps of:
providing an apparatus for rapidly cooking food comprising a housing comprising a reservoir, a hot plate, a heating element, a binary distributor a container configured to be placed in the housing in a position above the hot plate and below the binary distributor; and a gasket positioned between the container and the binary distributor;
placing food to be cooked into the container;
placing the container containing the food into the housing in the position above the hot plate and below the binary distributor;
pouring water into the reservoir; and
rapidly cooking the food by
heating the water in the reservoir via the heating element, thereby producing steam that travels into the binary distributor,
pressurizing the steam, via the binary distributor, thereby producing pressurized steam that exits a bottom of the binary distributor, and
introducing the pressurized steam from a top of the container, thereby cooking a top portion of the food contained in the container,
wherein the gasket is configured to create a vapor tight seal between the container and the binary distributor to prevent any pressurized steam exiting the binary distributor from escaping into the surrounding environment.

18. The method for rapidly cooking food of claim 17, wherein the food is a single package of ramen brick style noodles.

19. The method for rapidly cooking food of claim 17, wherein rapidly cooking the food further comprises:
- accumulating condensed steam at a bottom of the container; and
- warming the hot plate, via the heating element, to a temperature sufficient to reheat the condensed steam accumulated at the bottom of the container to a temperature at which the condensed steam is capable of cooking food in the container.

* * * * *